United States Patent [19]
Bocknek et al.

[11] Patent Number: 5,916,020
[45] Date of Patent: Jun. 29, 1999

[54] PROCESS AND APPARATUS FOR SEPARATING AND DELINKING SAUSAGES, WIENERS, OR SIMILAR PRODUCTS BY MECHANICAL AGITATION AND CONTACT WITH REFRIGERANT CRYOGENS

[75] Inventors: Joel A. Bocknek, Thornhill; Rocco G. Giorgio, Mississauga; Darrell R. Stoodley, Orangeville; Caroline A. Moziar, Guelph, all of Canada

[73] Assignee: Air Liquide Canada, Inc., Montreal, Canada

[21] Appl. No.: 08/938,603

[22] Filed: Sep. 26, 1997

[51] Int. Cl.⁶ .................................................. A22C 11/00
[52] U.S. Cl. .................................................. 452/49
[58] Field of Search .................................................. 452/49

[56] References Cited

PUBLICATIONS

*AIRCO Kryofoods*, "The New Kwikfreeze Tumbler: IQF Food Freezing Just Got A Little Easier".

*Primary Examiner*—Willis Little
*Attorney, Agent, or Firm*—Burns, Doane, Swecker & Mathis, L.L.P.

[57] ABSTRACT

A process and apparatus are described to completely separate linked sausages, wieners, or similar products and to remove the links from the ends of the product, i.e., delinking, through mechanical agitation, through the use of direct contact with refrigerant cryogens. The delinked and separated product can then also be individually quick frozen.

20 Claims, 2 Drawing Sheets

PROCESS AND APPARATUS FOR SEPARATING AND DELINKING SAUSAGES, WIENERS, OR SIMILAR PRODUCTS BY MECHANICAL AGITATION AND CONTACT WITH REFRIGERANT CRYOGENS

BACKGROUND OF THE INVENTION

1. Field of the Invention

The present invention relates to a process and apparatus for separating linked food products, and more specifically to completely separating sausages, wieners, or similar products and to remove the links from the ends of the product, i.e, delinking, through mechanical agitation, through the use of direct contact with refrigerant cryogens.

2. Brief Description of the Related Art

In the art of linked food product production, it is desirable to process a linked product containing multiple individual linked pieces by separating the individual linked pieces from one another, to remove any excess casing that may be attached to one or both ends of the individual linked piece ("delinking"), and to freeze the separated, delinked pieces.

Automatic cutting and grading systems, and sausage cutting systems, have been used to cut and separate individual pieces from a linked product, e.g., sausages and wieners. These prior cutting systems, however, only separate the individual pieces of the linked product. The cutting systems do not delink the product, i.e., remove the link (excess casing) from the end of the product. Accordingly, these prior cutting systems, although separating the individual pieces of the linked product, fail to delink the pieces, resulting in an undesirable product which includes excess casing. Furthermore, these prior cutting systems require an extremely high level of maintenance, because of the dulling and fouling of the cutting elements. They also have a high operational intensity, requiring many equipment adjustments throughout a production run.

Prior automatic cutting systems also do not provide any means by which the separated product can be frozen, which thereby requires additional equipment, handling, and production costs to freeze the cut and separated product for packaging and delivery.

Furthermore, prior automatic cutting systems suffer from frequent stoppages or jam-ups due to improper feeding of the product into the cutting equipment. As a result, there is a high occurrence of production downtime, which further increases production costs.

Prior automatic cutting systems are additionally disadvantageous because they suffer from high product reject rates. Unacceptable product is produced when the linked product is mis-cut by the automatic cutting system, e.g., the product is mis-cut when it is cut in half instead of the individual pieces being mutually separated. High product reject rates exacerbate the aforementioned deficiencies of prior automatic cutting systems, i.e., dulling and fouling of the cutting and separating elements, produce even higher levels of operational intensity, require additional handling of the rejected pieces, and incur increased down time due to system stoppages.

Linked products have also been separated and delinked manually. For example, scissors have been used to separate and delink a linked product. Manual separation and delinking is also extremely disadvantageous for at least several reasons.

The separation and delinking process first becomes very labor intensive when manual labor and scissors are used to separate and delink the product. Manual separation and delinking also exposes the laborer to the potential hazards of personal injury from the scissors. This requirement for manual labor, and its associated laborer safety concerns, understandably makes this a very costly process. Manual separation and delinking is also a slow and laborious process, which impacts on production efficiencies and therefore, ultimately, production cost. Manual separation and delinking processes, like automatic cutting systems, are also unable to freeze the product while performing the separation and delinking, which again increases the requirements for additional equipment and production line costs.

Tumblers have been used in the prior art to process food products. Tumblers have been used to massage meat food products, blend seasonings with food products, and to hydrate food products. Tumblers are commonly available in a variety of sizes and configurations. Tumblers have not, however, been used to separate and delink, and further to freeze food products.

It is therefore an object of the present invention to provide an economical and efficient process and apparatus for separating and delinking a linked product which does not suffer from the aforementioned failings of the prior art.

It is therefore another object of the present invention to provide a process and apparatus for separating and delinking a linked product which also can freeze the separated and delinked product.

SUMMARY OF THE INVENTION

According to exemplary embodiments of the present invention, a process and apparatus are described to completely separate linked sausages, wieners, or similar products, and to remove the links from the ends of the product, i.e., delink the product, through mechanical agitation and the use of direct contact with refrigerant cryogens. The delinked and separated product can also be individually quick frozen.

According to one aspect of the present invention, an apparatus for separating and delinking a linked food product, which includes multiple individual linked pieces, comprises a tumbler adapted to be rotated including an interior space sized to receive a linked food product therein, a cryogen injector including an inlet and an outlet, the outlet positioned to inject cryogen into the interior space when cryogen is supplied to the inlet, wherein when a linked product is placed in the interior space, the tumbler is rotated, and cryogen is supplied to the cryogen injector, the cryogen cools the linked product to a temperature sufficiently low to allow the rotating tumbler to mechanically agitate the linked product to thereby separate the linked product into individual pieces and to delink the individual pieces.

According to another aspect of the present invention, a process for separating and delinking a linked food product comprises the steps of contacting the linked food product with a cryogenic material to at least partially freeze the linked food product, and agitating the partially frozen linked food product sufficiently to separate the linked food product into individual pieces and to delink the individual pieces.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodi

DESCRIPTION OF THE PREFERRED EMBODIMENTS

The present invention combines two technologies, which were not previously combined, into one process: separation and delinking of a linked product. The product can also be frozen during the process. The apparatus and process according to the present invention eliminates mis-cut product and product jam-ups, and minimiizes maintenance and operator intensity. Production throughput and efficiency can be thereby greatly improved, which can result in decreased production costs. Labor requirements are also significantly reduced, making this a cost-effective process.

Figure 1:
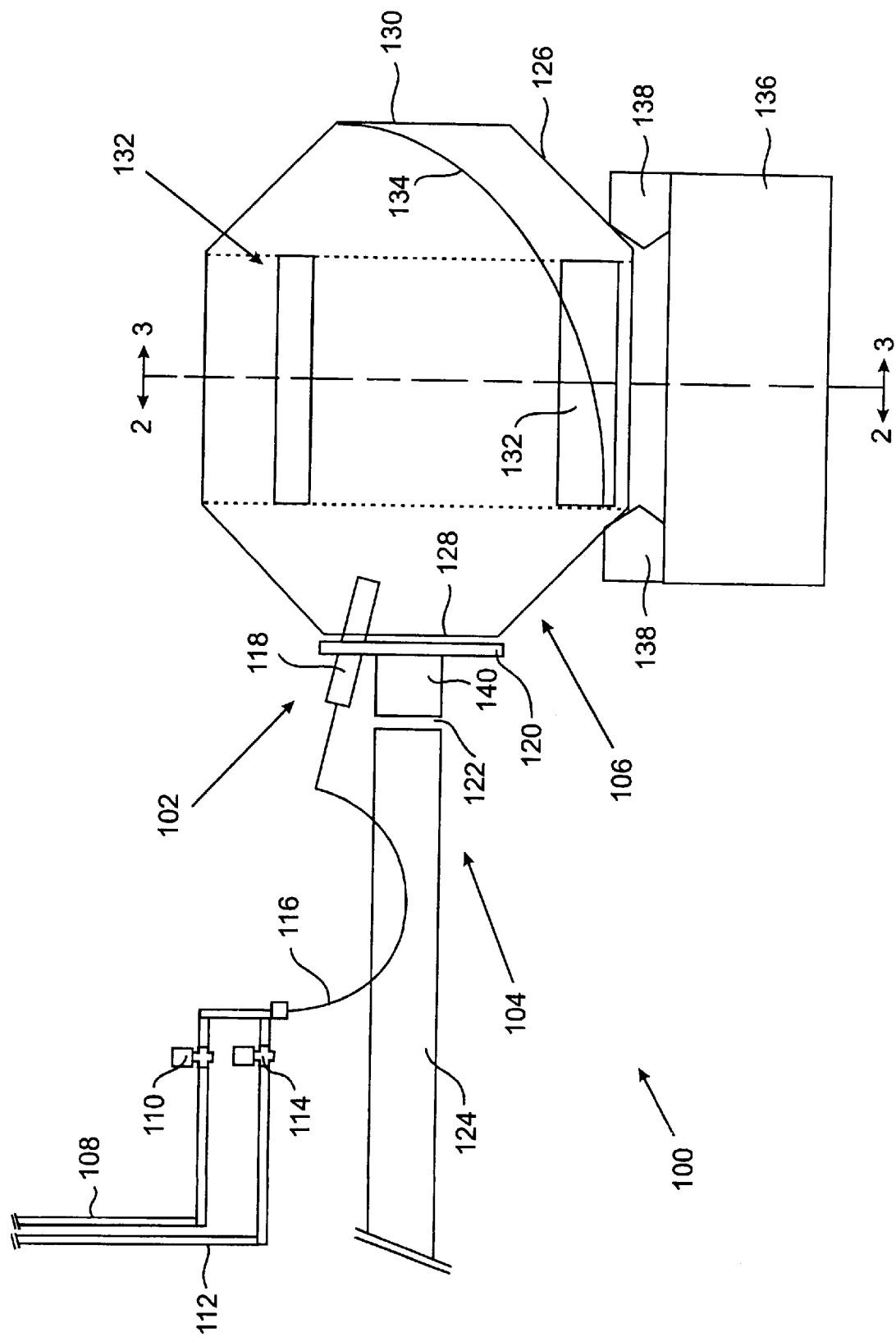
- FIG. 1 is an elevational side view illustration, with portions illustrated in cross-section, of an exemplary embodiment of an apparatus according to the present invention.

Turning now to the drawing figures, FIG. 1 illustrates an apparatus 100 in accordance with the present invention. Apparatus 100 includes a refrigerant cryogen injection system 102, an exhaust system 104, and an agitation system 106.

Cryogen injection system 102 includes a cryogen delivery line 112 leading from a source of cryogenic material (not illustrated) to flexible cryogen line 116. The cryogenic material is preferably liquid carbon dioxide ($LCO_2$) or liquid nitrogen ($LN_2$), although other cryogenic materials may be used without departing from the scope of the invention as will be readily apparent to one of ordinary skill in the art. Valve 114 is provided along cryogen delivery line 112 for manually controlling, or under automatic control, the flow of cryogenic material through the cryogen delivery line and cryogen delivery system 102. Cryogen injection system 102 further includes a gas purge line 108 leading from a source of purge gas (not illustrated) also to flexible cryogen line 116. Valve 110 is provided along gas purge line 108 for manually controlling, or under automatic control, the flow of purge gas through gas purge line 108 and cryogen delivery system 102. As will be readily appreciated by one of ordinary skill in the art, purge gas from gas purge line 108 is selectively allowed to flow through cryogen delivery system 102 to purge the system of residual cryogenic material, if present, to clean the cryogen delivery system.

Flexible cryogen line 116 leads to cryogen injector 118. Injector 118 includes an orifice (not illustrated) which controls the amount of cryogenic material injected into tumbler 126. The function of an orifice in a cryogen delivery system will be readily appreciated by one of ordinary skill in the art, and a detailed description thereof is therefore unnecessary to a complete understanding of the present invention. When the cryogenic material used is $LCO_2$, cryogen injector 118 is alternatively a cryogen injection horn, which includes a tube (not illustrated) downstream of the injector orifice, which aids in agglomerating, coalescing, or joining together carbon dioxide "snow" particles before injection into the tumbler 126. Injector 118 is mounted to a movable loading closure or plate 120, which is movably and at least partially, and optionally substantially, sealingly connected to agitation system 106, as will be described in greater detail below.

Cryogen injection system 102 includes a programmable logic controller (PLC) (not illustrated) which includes a timer for measuring the time of injection of cryogenic material into the agitation system 106. Cryogen delivery system 102 may also include flow controls, including pressure regulators, flow meters, and pressure gauges, sensors, and displays, in communication with the PLC to enable the PLC to control the flow of cryogen through the system, as will be readily apparent to one of ordinary skill in the art. For example, the PLC can be connected to control the state of valves 110, 114, to control the injection of cryogenic material and purge gas though cryogen delivery system 102. Cryogen delivery system 102 is preferably time regulated, i.e., the flow of cryogenic material to cryogen injection horn 118 is allowed for a predetermined time to effect separation and delinking of the linked food product.

Referring again to FIG. 1, agitation system 106 is illustrated partially in cross-section. Agitation system 106 includes a tumbler enclosure 126 which is roughly cylindrical in shape, although the tumbler enclosure can be constructed to be square or triangular in cross-section, or any other shape without departing from the scope of the invention. Tumbler 126 includes a loading port 128 at one end and a second end 130 at the end of the tumbler opposite the loading port. End 130 may be closed, or alternatively may include a second access port and movable closure (not illustrated) for providing access to the interior of tumbler 126. Tumbler 126 is rotatably attached by supports 138 to stand 136. Stand 136 houses a motor or the like (not illustrated) which is connected to tumbler 126 to rotate the tumbler about its longitudinal axis. The speed at which tumbler 126 can be rotated is variable and is controlled by controlling the speed at which the motor is operated.

Figure 2:
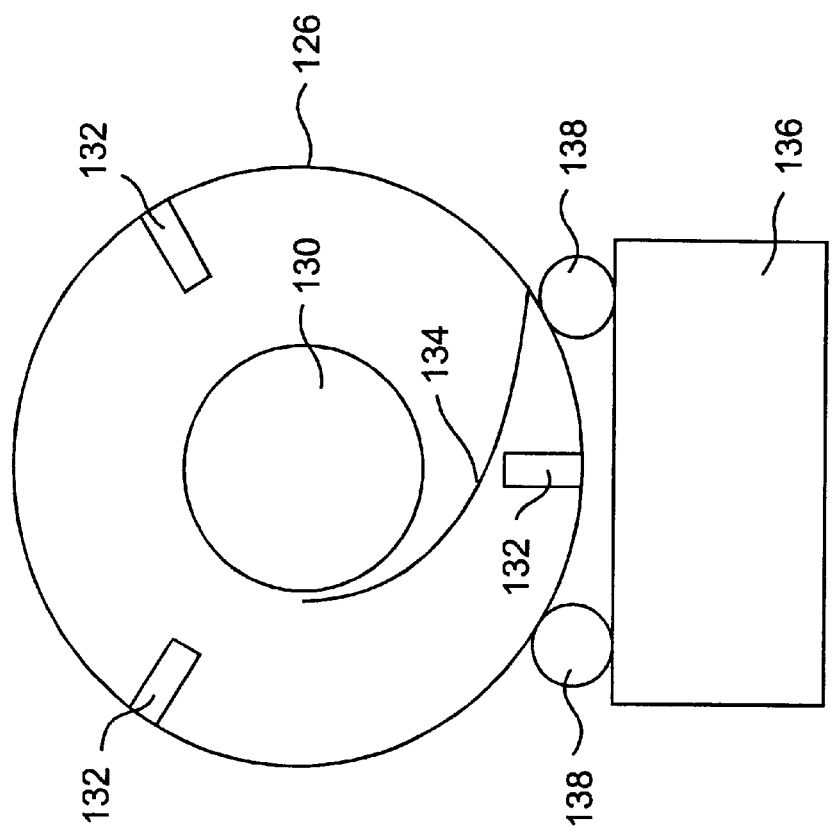
FIG. 2 is an cross-sectional view of the apparatus illustrated in FIG. 1, taken along line 2—2 in FIG. 1.
Figure 3:
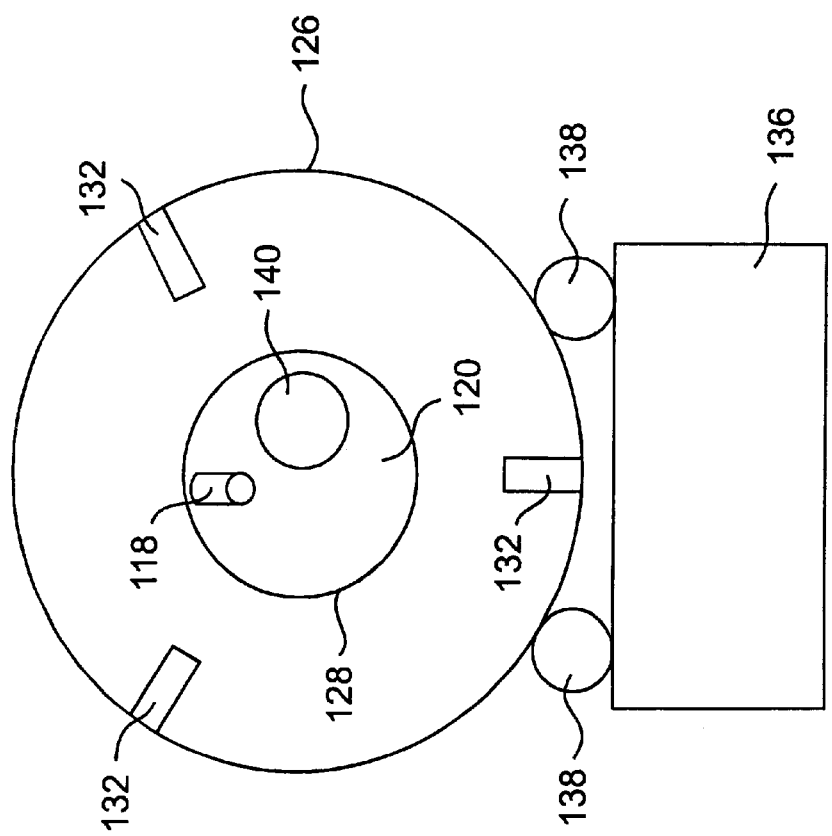
FIG. 3 is an cross-sectional view of the apparatus illustrated in FIG. 1, taken along line 3—3 in FIG. 1.

Tumbler 126 includes at least one, and preferably ten or more, agitating baffles 132 in an interior space thereof. Referring to FIGS. 2 and 3, agitating baffles 132 are preferably positioned substantially radial in tumbler 126, and are preferably regularly spaced around the interior of the tumbler. Agitating baffles 132 optionally can, however, be positioned non-radially in tumbler 126, and non-uniformly around the interior of the tumbler. Agitating baffles 132 act to both separate and delink a linked food product when it is placed in the tumbler 126, as described in greater detail below.

Tumbler 126 also includes at least one carrying baffle 134 in the interior space of the tumbler. Carrying baffle 134 is preferably a sloped baffle, as illustrated in FIGS. 1 and 3, which slopes in two different directions. Carrying baffle 134 functions to carry the contents of tumbler 126 from one end of the tumbler toward agitating baffles 132, to mix the contents and to ensure that the entire contents are agitated by the agitating baffles. In the embodiment illustrated in FIGS. 1–3, carrying baffle 134 carries the contents of tumbler 126 away from end 130. Additional or substitute carrying baffles (not illustrated) may also be provided for carrying the contents of the tumbler away from loading port 128.

The combination of agitating baffle(s) 132 and carrying baffle(s) 134 according to the present invention ensures that the contents of tumbler 126 are more uniformly agitated and exposed to the cryogen injected into the tumbler by injection horn 118. Uniform agitation and cryogen exposure of the contents of tumbler 126 enables the apparatus and processes according to the present invention to greatly enhance linked food product separation, delinking, and freezing, and to lower reject rates from prior separation and delinking processes.

Referring again to FIG. 1, exhaust system 104 is provided to exhaust spent cryogen vapors from the interior of agitating system 106. Exhaust system 104 includes an exhaust tube 124 which is connected to an exhaust device (not illustrated) at one end, e.g., an exhaust blower, and in fluid communication with the interior space of tumbler 126 at the other end. Exhaust tube 124 may be a single tube or, as illustrated in FIG. 1, may be constructed of two tubes. When exhaust tube 124 is constructed as two tubes, a short exhaust tube segment 140 is mounted on loading closure or plate 120. Short exhaust tube 140 extends away from tumbler 126 and toward exhaust tube 124. A gap 122 may be provided between exhaust tube 124 and short exhaust tube 140 to allow ambient air to enter into exhaust tube 124 to warm the exhaust from the interior of tumbler 126. Gap 122 can be a longitudinal gap, as illustrated in FIG. 1, or may be a radial gap between short exhaust tube 140 and exhaust tube 124, or both. Such a radial gap 122 can be provided by forming short exhaust tube 140 with an outer diameter smaller that the internal diameter of exhaust tube 124. If only a radial gap 122 is preferred, the length of short exhaust tube 140 is selected such that the downstream end of the short exhaust tube, that end closest to exhaust tube 124, is within and surrounded by exhaust tube 124. If both a radial and a longitudinal gap is preferred between short exhaust tube 140 and exhaust tube 124, the length of short exhaust tube 140 is selected such that the downstream end of the short exhaust tube is not surrounded by the upstream end of exhaust tube 124, and the external diameter of the short exhaust tube is less than the internal diameter of exhaust tube 124. If no gap 122 is preferred, tubes 124 and 140 may be made integral. Exhaust system 104 also includes supports (not illustrated) for supporting the components of the exhaust system.

Turning now to FIG. 2, loading closure or plate 120 is illustrated through loading port 128. Cryogen injector 118 extends through closure 120 and loading port 128 to be in fluid communication with the interior of tumbler 126. Short exhaust tube 140 (or, if preferred, exhaust tube 124, as discussed above) connects to closure 120 such that the vacuum exhaust source (not illustrated) is in fluid communication with the interior of tumbler 126. Exhaust tube 124 or short exhaust tube 140, and cryogen injector 118, may be offset from the center of closure 120, as illustrated in FIG. 2, or either may be centered on the closure. As will be readily apparent to one of ordinary skill in the art, the injection pressure of cryogen through cryogen injector 118 and the exhaust flow rate in exhaust tube 124 are selected so that cryogen injected into tumbler 126 is allowed to mix throughout the interior of the tumbler and with the contents thereof before being drawn out of the tumbler.

Turning now to FIG. 3, one configuration of agitating baffles 132 and carrying baffle 134 according to the present invention is illustrated. Carrying baffle 134 extends from one side of end 130 down and to the right, as illustrated at the cross section in FIG. 3, and ends at the interior wall of tumbler 126. Thus, tumbler 126 is rotated so that the contents of the tumbler are carried away from end 130 and toward agitating baffles 132. The contents of tumbler 126 are therefore repeatedly brought into contact with agitating baffles 132, and more uniformly exposed to cryogen injected into the tumbler.

The function and operation of the embodiment described above will now be described with reference to FIGS. 1–3. Closure 120 is moved away from loading port 128 to allow access to the interior of tumbler 126, and a linked food product (not illustrated) is then placed into the tumbler. The amount of linked food product placed in tumbler 126 can vary, subject to the following constraints. If too much product is placed in tumbler 126, there will not be enough room left in the tumbler to allow for sufficient agitation by agitating baffles 132 to separate and delink the product, and further to allow individual pieces to not interfere with the agitation of other individual pieces. A ratio of the volume of tumbler 126 to the volume of linked food product of about 20:1 is preferable for some linked food products; other ratios will be preferable for other linked food products and are within the scope of the invention.

With the linked food product in the interior of tumbler 126, closure 120 is replaced over loading port 128. Closure 120 and loading port 128 may form a complete dynamic seal or may form an incomplete seal, thus partially exposing the interior of tumbler 126 to the ambient atmosphere. Valve 114 is operated to commence the flow of cryogenic material to injector 118 and into tumbler 126, and the tumbler motor (not illustrated) is operated to rotate tumbler 126. The motor speed is selected to balance agitation of the contents of the tumbler, product damage, and consistent and homogeneous crust freezing of the entire contents, if desired, to achieve proper mixing of the cryogenic material and tumbler contents. The optimal speed will therefore vary for different kinds and amounts of linked food products, type of cryogenic material, and tumbler sizes, as will be readily apparent to one of ordinary skill in the art.

When liquid carbon dioxide ($LCO_2$) is delivered to cryogen injector 118 for use as the cryogenic material, carbon dioxide "snow" (a mixture of carbon dioxide vapor and solid) is delivered from the cryogen injector. When liquid nitrogen ($LN_2$) is delivered to cryogen injector 118 for use as the cryogenic material, a mixture of nitrogen vapor and liquid is delivered from the cryogen injector. Cryogenic material is preferably injected into tumbler 126 very close to the beginning of rotation of the tumbler, and preferably immediately preceding it, to allow the cryogenic material to cool the linked food product and the tumbler as agitation of the linked food product commences. Carbon dioxide snow can be added to tumbler 126 prior to adding the linked food product, and then the tumbler rotated to effect separation and delinking of the linked food product. Carbon dioxide snow can also be added immediately preceding or immediately after the commencement of the rotation of tumbler 126.

The linked food product contained in tumbler 126 is cooled, preferably partially frozen, and optionally completely frozen, by the cryogenic material in the tumbler. The casing of the linked food product is rendered substantially more brittle because it is frozen by the cryogenic material with which it has come into contact. Rotation of tumbler 126 causes agitation baffles 132 to contact the linked food product to break the casing between and thereby separate the individual pieces, and further to delink the individual pieces by breaking off pieces of casing left attached to the individual pieces after separation from other individual pieces. Carrying baffle(s) 134 carry the contents of tumbler 126 away from the end of the tumbler and toward the agitating baffles 132, to ensure that the contents of the tumbler are uniformly exposed to cryogenic material and agitated. Optionally, additional cryogenic material can be injected into tumbler 126, after separation and delinking are complete, to completely freeze the separated and delinked individual pieces. Thereafter, or after a predetermined time, the tumbler's rotation is stopped, closure 120 is moved away from loading port 128, and the separated, delinked, and optionally frozen individual pieces can be removed for further processing or packaging. The above process may then be repeated.

Cryogen delivery system 102, as discussed above, is preferably under the control of a PLC and is time regulated.

Cryogen delivery system 102 may optionally be temperature regulated, by providing a temperature sensor in a temperature sensing relationship with the interior of tumbler 126, to sense the temperature of the contents of the tumbler and generate a temperature signal therefrom. The temperature signal thus generated can then be used in a control feedback loop to the PLC, or a programmable computer, to control the flow of cryogenic material to tumbler 126.

The process described above is a batch process. According to another embodiment of the present invention, a process for separating and delinking a linked food product is a continuous process. In a continuous process according to the present invention, linked food product is continuously fed into and removed from a tumbler including agitation baffles and carrying baffles. Cryogenic material is continuously injected into the tumbler to effect cooling, preferably partial freezing, and optionally complete freezing, of the linked food product. While being carried through the tumbler by the carrying baffles, the cooled linked food product is agitated by the agitating baffles to separate the linked food product and delink the resultant individual pieces.

While the invention has been described in detail with reference to preferred embodiments thereof, it will be apparent to one skilled in the art that various changes can be made, and equivalents employed, without departing from the scope of the invention.

What is claimed is:

1. An apparatus for separating and delinking a linked food product which includes multiple individual linked pieces, comprising:

a tumbler adapted to be rotated including an interior space sized to receive a linked food product therein;

a cryogen injector including an inlet and an outlet, said outlet positioned to inject cryogen into said interior space when cryogen is supplied to said inlet;

at least one agitating baffle in said interior space, said at least one agitating baffle for agitating said linked product, and separating and delinking said individual linked pieces, when a linked product is in and cryogen is injected into said interior space; and a carrying baffle in said interior space, said carrying baffle for carrying said linked product, said individual pieces, or both away from one end of said interior space;

wherein when a linked product is placed in said interior space, said tumbler is rotated, and cryogen is supplied to said cryogen injector, said cryogen cools said linked product to a temperature sufficiently low to allow said rotating tumbler to mechanically agitate said linked product to thereby separate said linked product into individual pieces and to delink said individual pieces.

2. An apparatus for separating and delinking a linked food product according to claim 1, said tumbler further comprising a loading port for allowing access to said interior space to load and unload linked product and individual pieces from said interior space.

3. An apparatus for separating and delinking a linked food product according to claim 2, further comprising a loading closure movable between a first position substantially sealing said loading port and a second position allowing access to said interior space, said cryogen injector mounted through said loading closure.

4. An apparatus for separating and delinking a linked food product according to claim 3, wherein said cryogen injector is configured and arranged to remain stationary when said tumbler rotates.

5. An apparatus for separating and delinking a linked food product according to claim 3, further comprising an exhaust line in fluid communication with said interior space through said loading closure.

6. An apparatus for separating and delinkig a linked food product according to claim 1, further comprising a source of cryogen in fluid communication with said cryogen injector selected from the group consisting of liquid carbon dioxide and liquid nitrogen.

7. An apparatus for separating and delinking a linked food product according to claim 1, wherein said carrying baffle and said at least one agitating baffle are constructed and arranged, when a linked product, an individual piece, or both are in said interior space, to carry said linked product, said individual piece, or both from one end of said interior space to said at least one agitating baffle.

8. An apparatus for separating and delinking a linked food product according to claim 1, further comprising a motor connected to rotate said tumbler.

9. An apparatus for separating and delinking a linked food product according to claim 1, wherein said cryogen injector comprises an orifice for affecting a pressure change in cryogenic material when cryogenic material flows through said cryogen injector.

10. An apparatus for separating and delinking a linked food product according to claim 9, wherein said cryogen injector comprises a cryogen injection horn.

11. A process for separating and delinking a linked food product, comprising the steps:

contacting said linked food product with a cryogenic material to at least partially freeze said linked food product; and agitating said partially frozen linked food product sufficiently to separate said linked food product into individual pieces and to delink said individual pieces.

12. A process for separating and delinking a linked food product according to claim 11, wherein said contacting step comprises the step of contacting said linked food product with a cryogenic material selected from the group consisting of liquid carbon dioxide, carbon dioxide snow, and liquid nitrogen.

13. A process for separating and dellnking a linked food product according to claim 11, wherein said agitating step further comprises contacting said linked food product with an agitating baffle to separate said linked food product into individual pieces.

14. A process for separating and delinking a lined food product according to claim 13, wherein said agitating step further comprises contacting said linked food product with a carrying baffle to carry said linked food product toward said agitating baffle.

15. A process for separating and delinking a linked food product according to claim 11, further comprising freezing said individual pieces with said cryogenic material.

16. A process for separating and delinking a linked food product according to claim 11, wherein said agitating step comprises rotating a tumbler containing said linked food product.

17. A process for separating and delinking a linked food product according to claim 16, wherein said contacting step comprises injecting said cryogenic material into said tumbler while said tumbler is rotating.

18. A process for separating and delinking a linked food product according to claim 16, wherein said contacting step comprises injecting said cryogenic material into said tumbler prior to rotating said tumbler.

19. A process for separating and delinking a linked food product according to claim 18, wherein said contacting step comprises injecting carbon dioxide snow into said tumbler prior to rotating said tumbler.

20. A process for separating and delinking a linked food product according to claim 16, further comprising exhausting an interior space of said tumbler.

* * * * *

UNITED STATES PATENT AND TRADEMARK OFFICE
CERTIFICATE OF CORRECTION

PATENT NO. : 5,916,020
DATED : June 29, 1999
INVENTOR(S) : Joel A. Bocknek et al.

It is certified that error appears in the above-indentified patent and that said Letters Patent is hereby corrected as shown below:

Column 8, Claim 6, line 1, delete "delinkig" and insert --delinking--.

Column 8, Claim 13, line 1, delete "dellnking" and insert --delinking--.

Column 8, Claim 14, line 1, delete "lined" and insert --linked--.

Signed and Sealed this

Second Day of May, 2000

Attest:

Q. TODD DICKINSON

Attesting Officer

Director of Patents and Trademarks